Aug. 28, 1934.  W. ALLAM  1,971,333
REAR VIEW MIRROR VISOR OR SHIELD
Filed June 6, 1933
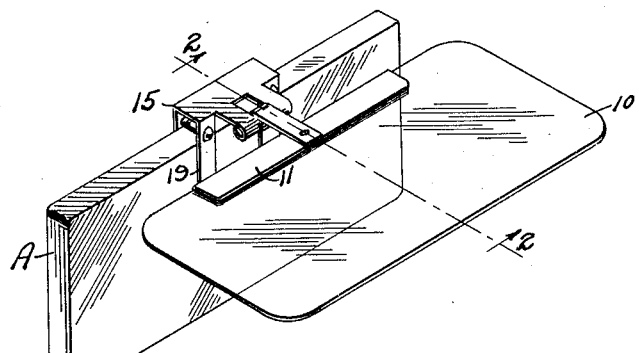
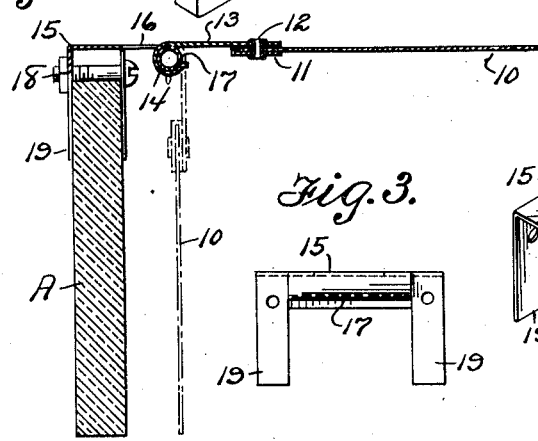
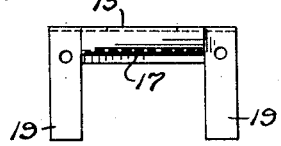
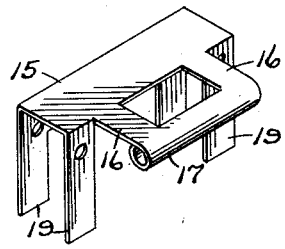
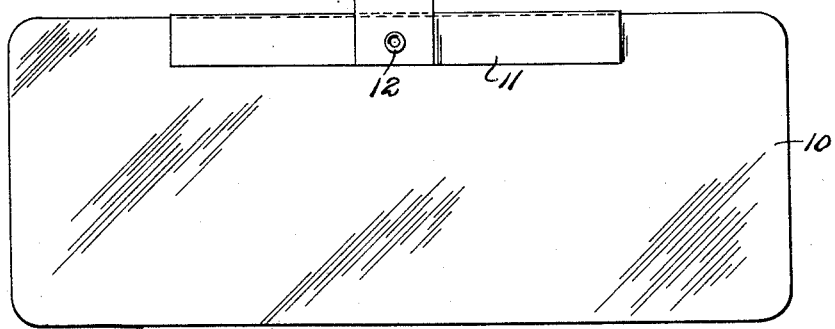
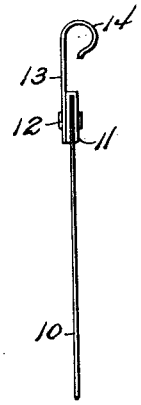
Wilmer Allam INVENTOR
BY Victor J. Evans & Co.
ATTORNEY

UNITED STATES PATENT OFFICE 1,971,333

REAR VIEW MIRROR VISOR OR SHIELD

Wilmer Allam, Hazleton, Pa.

Application June 6, 1933, Serial No. 674,574

1 Claim. (Cl. 45—97)

The invention relates to a rear view mirror visor and more particularly to an adjustable shield for rear view or windshield mirrors.

The primary object of the invention is the provision of a visor or shield of this character, wherein through the use of a mounting, the same can be supported from a rear view mirror and is susceptible of swinging movement vertically for angular adjustment so as to eliminate light reflection.

Another object of the invention is the provision of a visor or shield of this character, wherein the glare due to light reflection from the rear view mirror will be materially reduced and at the same time vision of the road at the rear may be accurately had, the mounting of the visor or shield being of novel construction.

A further object of the invention is the provision of a visor or shield of this character which is extremely simple in construction, thoroughly reliable and efficacious in its use and purposes, readily and easily adjusted, strong, durable, and inexpensive to manufacture and install.

With these and other objects in view, the invention consists in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing:

Figure 1 is a perspective view of a rear view mirror showing the visor or shield in association therewith.

Figure 2 is an enlarged sectional view on the line 2—2 of Figure 1 looking in the direction of the arrows.

Figure 3 is an elevation of the mounting for the visor or shield.

Figure 4 is a perspective view of this mounting.

Figure 5 is a plan view of the visor or shield detached from the mounting.

Figure 6 is an end elevation of the detached visor.

Similar reference characters indicate corresponding parts throughout the several views in the drawing.

Referring to the drawing in detail, A designates generally a rear view mirror or what is more commonly termed a windshield mirror, which can be of any standard type. Adapted to be carried by this mirror A is the visor or shield constituting the present invention and hereinafter more fully described.

The visor comprises a sheet-like body 10, preferably made from a light absorbing material, as for example, bakelite, and is of a shape and size alike to the mirror. At one longer edge of the body 10 is a substantially U-shaped clip 11, this being preferably spaced an equidistance from opposite ends of the body and secured by a rivet 12 thereto. The rivet 12 connects with this clip a hinge part or extension 13 having a spring coiled terminal 14 for a purpose presently described.

Carried by the mirror A is the mounting or hanger for the visor or shield and the same is in the form of an inverted U-shaped clip 15 having cut and bent therefrom pivot extensions 16, these being at right angles to the vision face of the mirror A and integrally formed with a hollow or tubiform-like pintle or pivot 17 with which is frictionally engaged the terminal 14 so that in this manner the visor or shield constituted by the body 10 is swingingly connected with the mirror A. In this pivotal mounting of the visor or shield it can be readily swung vertically at varying angular positions with respect to the vision face of the mirror A so as to enable the user of the mirror to reduce glare from lights reflected in the mirror.

The clip 15 carried by the mirror is made fast thereto by fasteners 18, each in the form of a nut carrying bolt, these being passed through the limbs 19 of the clip 15 just above the top edge of the mirror A so as to rest against this edge. It will be apparent that by removal of the nut from the bolts constituting the fasteners 18 the mounting or clip 15 can be readily detached from the mirror.

As has been stated, the visor or shield will greatly reduce glare from the mirror A, thus relieving the annoyance to the driver from this source and giving him a more accurate vision of the road.

What is claimed is:

In combination, a mirror, a shield adapted for placement at the vision side of the mirror, a mounting including a flat main portion and pairs of spaced arms at right angles thereto engaged with the mirror, a tubular portion offset from the main portion, a spring clip carried by the shield and frictionally embracing the tubular portion for permitting angular swinging adjustment of the shield, webs uniting the ends of the tubular portion with the main portion and confining the clip therebetween, and fasteners passed transversely through the pairs of arms and resting upon the top edge of the mirror.

WILMER ALLAM.